United States Patent
Tsai

(10) Patent No.: US 6,353,486 B1
(45) Date of Patent: *Mar. 5, 2002

(54) DEVICE FOR IMPROVING SCANNING QUALITY OF IMAGE SCANNER

(75) Inventor: Jenn-Tsair Tsai, Taipei Hsien (TW)

(73) Assignee: Mustek Systems, Inc., Hsinchu (TW)

( * ) Notice: Subject to any disclaimer, the term of this patent is extended or adjusted under 35 U.S.C. 154(b) by 37 days.

This patent is subject to a terminal disclaimer.

(21) Appl. No.: 09/632,206

(22) Filed: Aug. 2, 2000

Related U.S. Application Data

(63) Continuation of application No. 09/118,213, filed on Jul. 17, 1998, now Pat. No. 6,144,467.

(51) Int. Cl.$^7$ ................................................ H04N 1/40
(52) U.S. Cl. ...................................... 358/474; 382/286
(58) Field of Search ................................ 358/474, 486, 358/497, 496; 382/286, 281

(56) References Cited

U.S. PATENT DOCUMENTS

| | | | | |
|---|---|---|---|---|
| 4,864,415 A | | 9/1989 | Beikirch et al. | 358/474 |
| 4,870,505 A | | 9/1989 | Mitsuki | 358/494 |
| 4,933,778 A | * | 6/1990 | Tufano | 358/488 |
| 5,144,455 A | * | 9/1992 | Stein | 358/443 |
| 6,144,467 A1 | * | 11/2001 | Jenn-Tsair | 358/497 |

* cited by examiner

*Primary Examiner*—Jerome Grant, II
*Assistant Examiner*—Negussie Worku

(57) ABSTRACT

An image scanner having an improved scanning quality is disclosed. Two different color blocks having an interface therebetween are provided on the document platform of the image scanner. The image pickup device passes by the color blocks prior to the document area so that color calibrations and/or error detection can be performed before the scanning operation is performed. By this way, the color data such as the brightness of the obtained image can be compensated, and the deflection rate and/or the amplification error of the image pickup device can be corrected.

9 Claims, 4 Drawing Sheets

DEVICE FOR IMPROVING SCANNING QUALITY OF IMAGE SCANNER

CROSS-REFERENCE TO RELATED APPLICATION

This application is a continuation of Ser. No. 09/118,213, filed Jul. 17, 1998 now issued as U.S. Pat. No. 6,144,467.

FIELD OF THE INVENTION

The present invention is related to an image scanner, and more particularly to an image scanner which includes means for correcting the scanning results so as to have a better scanning quality. The present invention is also related to a method for improving scanning quality of an image scanner.

BACKGROUND OF THE INVENTION

Nowadays, an image scanner has gradually become a standard peripheral equipment of a personal computer. Therefore, scanner manufacturers have been trying their best to improve the scanning quality, for example, to compensate brightness, chrominance, etc., and/or correct scanning line errors. On the other hand, high scanning speed is also a criterion of an exquisite image scanner.

In order to enhance the scanning speed of an image scanner, several devices and methods have been proposed in prior art. For example, please refer to FIG. 1 which schematically shows home-sensor means for speeding up the movement of an image pickup module 11 from a standby line N to a scan start line M, i.e. a document reference line. In this case, it is assumed that the image pickup module 11 reaches the scan start line M after moving a distance D from the standby line N along the arrow direction. In other words, the image pickup module 11 directly moves a pre-determined distance, rather than moves pixel by pixel to detect the presence of a document, and then starts scanning. Therefore, the movement of the image pickup module 11 from the standby line N to the scan start line M is fast.

However, there are likely to be defects resulting from errors of various parts and/or assembling inaccuracy in this home sensor means. For example, if the image pickup module 11 is inaccurately installed at a position lower than a predetermined one while assembling, i.e. the standby line is lowered, the actual scan start line M1 will be accordingly lower than the document reference line M after the same distance D of movement, referring to the dotted lines and the dotted arrow in FIG. 1. Therefore, the top portion 13 of the document 12 will be missed out in the scanning operation.

On the other hand, when the image pickup module 11 reaches the scan start line M, the nth pixel unit of a CCD of the image pickup module 11 generally serves as the start point of the same scanning line, and the nth pixel unit and the pixel units thereafter are used to simultaneously pick up the image of the document line by line. If the image pickup module 11 slightly deflects from its pre-determined path owing to an assembling defect, the same distance D of movement will make the image pickup module 11 reach another line M2 rather than the pre-determined scan start line M, referring to the dotted line and the dotted arrow of FIG. 2, so that the nth pixel unit of the CCD will be a little shifted, and the scanning of a left portion 14 of the document might be missed out. In addition, the scanning lines will slant.

Another conventional means is proposed to avoid the missing of document data. Please refer to FIG. 3 which schematically shows means for precisely determining a scan start point in an image scanner. On the scanning platform of this image scanner, a black region 21 is provided in front of a scan start line R where a front edge of a document 22 to be scanned is positioned. In this case, the image pickup module (not shown) quickly moves toward the black region 21, and then slowly passes through the black region 21 after reaches the black region 21 to detect the disappearance of the black color. When the detected black color disappears, the image pickup module keeps on moving and begins to measure a distance Q along the arrow direction. It is assumed that the scan start line R is reached after the image pickup module moves the distance Q from the reference point P. By this way, the downshift error resulting from the downshift installation of the image pickup module, as shown in FIG. 1, can be avoided because the predetermined distance Q is measured from the lower edge of the black region, i.e. the reference point P, rather than from the standby line of the image pickup module. Nevertheless, the defect of the conventional scanner indicated in FIG. 3 still exists in this means, and is not resolved.

SUMMARY OF THE INVENTION

Therefore, an object of the present invention is to provide an image scanner, which can use single means to simultaneously adjust various scanning results to improve scanning quality.

Another object of the present invention is to provide a method for improving scanning quality of an image scanner by easily and conveniently performing color calibration, and detection and correction of a deflection rate and/or an amplification error.

A first aspect of the present invention is directed to an image scanner. The image scanner includes a scanning platform for placing thereon an object to be scanned, which is marked thereon a document line for positioning a front edge of the object, a first color block located in front of the document line along a specific direction, and a second color block located in front of the document line along the specific direction and having an interface with the first color block; and the image scanner also includes a photo-signal processing device passing by the scanning platform from a home position along the specific direction, and performing a scanning operation from a scan start point behind the first and the second color blocks to read image data of the object, and converting the image data of the object into digital data for further processing. According to this aspect of the present invention, the interface of the first and the second color blocks includes a first reference point and a second reference point whose coordinates are detected according to color changes therearound, a shift from the first reference point to the scan start point is of a predetermined vector which can be used together with the coordinate of the first reference point for determining a position of the scan start point, and a distance between the first and the second reference points is of a constant value which can be used together with the coordinates of the first and the second reference points for determining a deflection rate of a scan track and an amplification error of a scan result.

In addition to the purposes of accurate scan start point, deflection correction and amplification adjustment, the first and the second color blocks can also be provided for color calibrations of the scan result. For example, if the two color blocks are formed of regions of standard white and standard black, respectively, calibrations of a light and a dark responses can be performed.

In a preferred embodiment, the first color block is enclosed within the second color block, and the first and the second color blocks are formed of regions of standard white and standard black, respectively, so that the. photo-signal processing device sequentially passes by the standard black region, the standard white region and the standard black region to perform color calibrations and error detection before the scanning operation starts. Alternatively, the first color block can be a standard black region and the second color block can be a standard white region so that the sequence the photo-signal processing device passes by is first the standard white region, next the standard black region and then the standard white region, and the same purposes can be achieved.

It is to be noted that the first constant value should be set adequately so as to maximize the overall scan speed while avoiding the scanning operation starting after the photo-signal processing device passes by the document line. In other words, it is preferred that the distance between the scan start point and the document line is no less than the first constant value.

A second aspect of the present invention is directed to another image scanner. The image scanner includes a scanning platform for placing thereon an object to be scanned, which is marked thereon a document line for positioning a front edge of the object, a first elongated color block located in front of the document line along a specific direction, and a second elongated color block located in front of the document line along the specific direction and having an interface with the first color block; and the image scanner also includes a photo-signal processing device passing by the scanning platform from a home position along the specific direction, and performing a scanning operation from a scan start point behind the first and the second color blocks to read image data of the object, and converting the image data of the object into digital data for further processing. According to this aspect of the present invention, each of the first and the second elongated color blocks has a length greater than a length of the photo-signal processing device so that the photo-signal processing device detects colors of the first and the second elongated color blocks as standard colors for color calibrations when the photo-signal processing device passes by the first and the second elongated color blocks, and wherein the interface of the first and the second color blocks includes a first reference point and a second reference point whose coordinates are detected according to color changes therearound, a shift from the first reference point to the scan start point is of a predetermined vector which can be used together with the coordinate of the first reference point for determining a position of the scan start point, and a distance between the first and the second reference points is of a constant value which can be used together with the coordinates of the first and the second reference points for determining a deflection rate of a scan track and an amplification error of a scan result.

A third aspect of the present invention is directed to a method for improving a scanning quality of an image scanner. The image scanner includes a scanning platform for placing thereon an object to be scanned, and a photo-signal processing device passing by the scanning platform along a specific direction to perform a scanning operation for the object. The method includes steps of providing a document line on the scanning platform for positioning the object; providing a first color block on the scanning platform, which is located in front of the document line along the specific direction; providing a second color block on the scanning platform, which is located in front of the document line along the specific direction and has an interface with the first color block; detecting respective coordinates of a first and a second reference points in the interface of the first and the second color blocks according to color changes around the first and the second reference points when the photo-signal processing device passes by the first and the second color blocks along the specific direction; determining a scan start point according to the coordinate of the first reference point and a predetermined vector indicative of a shift from the first reference point to the scan start point; and determining a deflection rate and/or an amplification error of a scanning result according to the coordinates of the first and the second reference points and a predetermined distance between the first and the second reference points for correction of the scan result.

Preferably, the present method further includes a step of detecting colors of the first and the second color blocks as standard colors for color calibration of the scanning result when the photo-signal processing device passes by the first and the second color blocks along the specific direction.

In a preferred embodiment, the first and the second color blocks are rectangular regions of standard white and standard black, respectively, for performing color calibrations of a light and a dark responses, and the first color block is enclosed within the second color block so that the photo-signal processing device sequentially passes by the standard black region, the standard white region and the standard black region along the specific direction. As for the interface between the first and the second color blocks, the line overlapping either a front edge or a rear edge of the first color block can be indicated as the interface. In this case, the first and the second reference points are two end points of the indicated edge.

In another preferred embodiment, the first and the second color blocks are rectangular regions of standard black and standard white, respectively, for performing color calibrations of a dark and a light responses, and the first color block is enclosed within the second color block so that the photo-signal processing device sequentially passes by the standard white region, the standard black region and the standard white region. As for the interface between the first and the second color blocks, the line overlapping either a front edge or a rear edge of the first color block can be indicated as the interface. In this case, the first and the second reference points are two end points of the indicated edge.

According to the method according to the present invention, the photo-signal processing device moves a pre-determined distance from the interface along the specific direction to reach a scan start point where the scanning operation starts to be performed. The pre-determined distance should be adequately selected to have the scan operation start at the moment or before the photo-signal processing device reaches the document line.

When the detected coordinate positions of the first and the second reference points have been determined as (x1,y1) and (x2,y2), respectively, the deflection rate m can be calculated by equation $m=(y2-y1)/(x2-x1)$, and the amplification error $\rho$ can be calculated by equation $\rho=1-[(x2-x1)^2+(y2-y1)^2]^{1/2}/L$, in which $[(x2-x1)^2+(y2-y1)^2]^{1/2}$ indicates a detected length between the two reference points, and L indicates a predetermined distance between the two reference points.

BRIEF DESCRIPTION OF THE DRAWING

The present invention may best be understood through the following description with reference to the accompanying drawings, in which: intended to be exhaustive or to be limited to the precise form disclosed.

DETAILED DESCRIPTION OF THE PREFERRED EMBODIMENT

Figure 1:
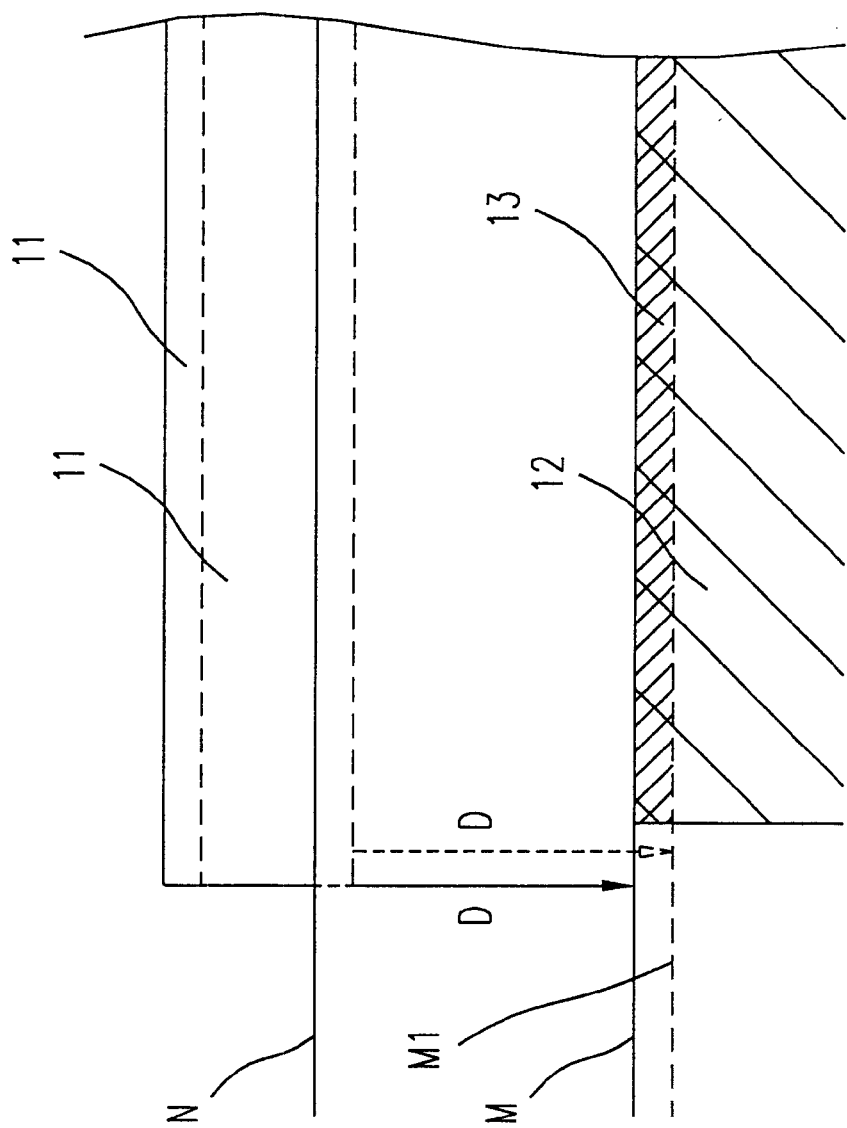
FIG. 1 schematically shows conventional means for locating a scan start of an image scanner, and a possible error is revealed.
Figure 2:
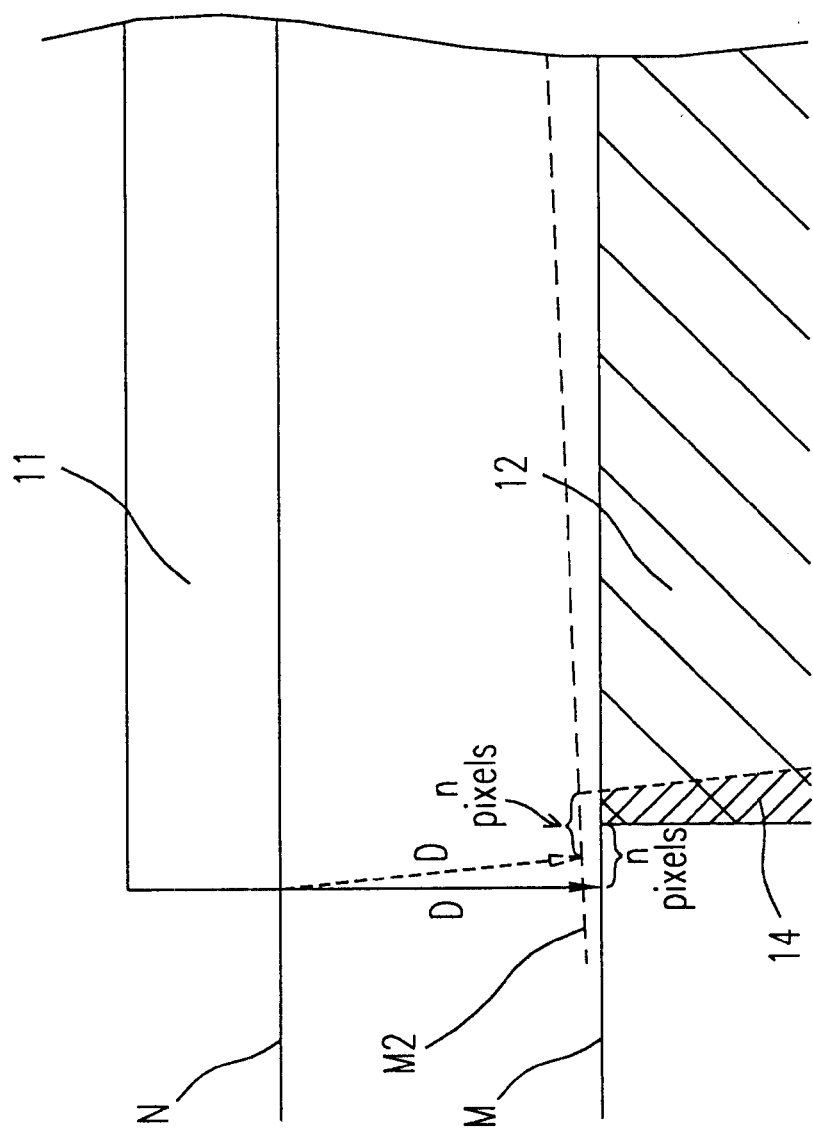
FIG. 2 schematically reveals another possible error of the means of FIG. 1.
Figure 3:
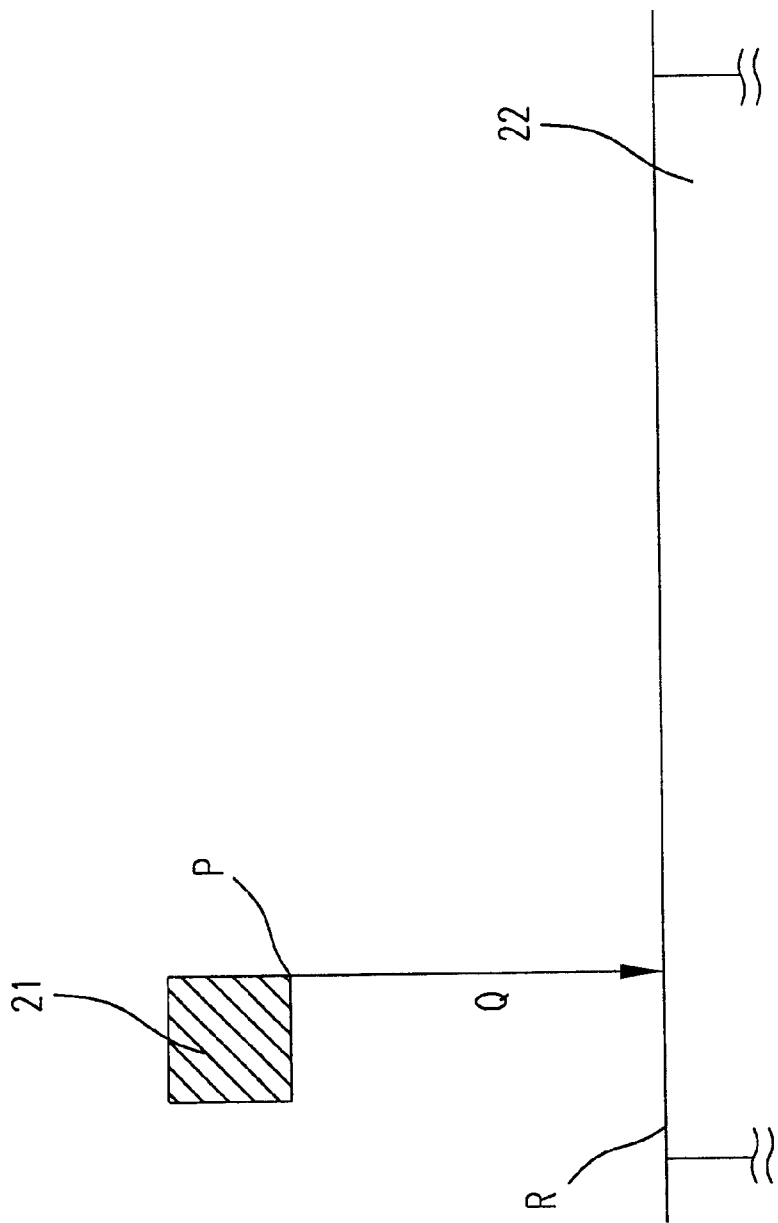
FIG. 3 schematically shows another conventional means for locating a scan start of an image scanner.
Figure 4:
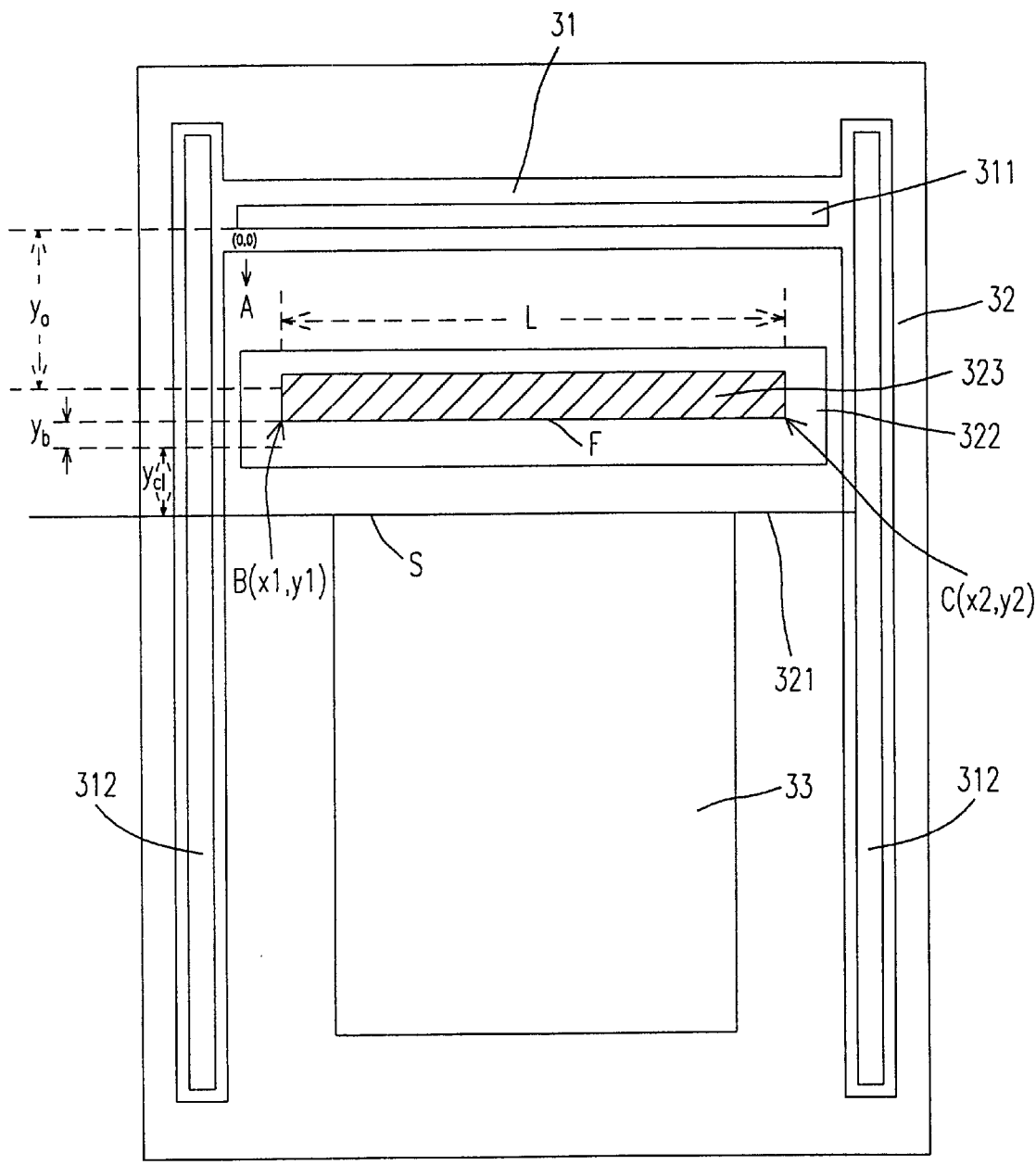
FIG. 4 schematically shows a preferred embodiment of an image scanner according to the present invention.

The present invention will now be described more specifically with reference to the following embodiments. It is to be noted that the following descriptions of preferred embodiments of this invention are presented herein for purpose of illustration and description only; it is not Please refer to FIG. 4 which is a schematic diagram showing a preferred embodiment of an image scanner according to the present invention from a top view. The image scanner includes a photo-signal processing device 31 and a scanning platform 32. The scanning platform 32 is marked thereon a document line 321, a standard white rectangular block 322 and a standard black rectangular block 323. The black block 321 is enclosed within the white block 322 so that they have the rectangular circumference of the black block 323 as an interface, and a long edge F of the black block 323 having a length L is one of the interfaces and has two end points B and C. In addition, both of the blocks 322 and 323 are located upstream of the document line 321. The photo-signal processing device 31 includes an image pickup device 311 and a driving device 312. The image pickup device 311 is for example a CCD having a series of pixel units. The driving device 312 for example includes a motor device, a gear device, and a belt device (not shown), which are well known to those skilled in the art and not to be redundantly described here. The pixel units of the CCD 311 serve as the X-axis of a coordinate, and the movement track of the first pixel unit along the direction of the arrow A serves as the Y-axis of the coordinate. In other words, the coordinate position of the first pixel unit at the original position is (0,0).

After a document 33 is properly positioned in a document region behind the document line 321, and a scanning operation is ready to be performed, the driving device 312 transmits the image pickup device 311 to move along a direction of an arrow A so as to pass by the upper portion of the white block 322, the black block 323, the lower portion of the white block 322, and the document 33 sequentially. In details, the CCD 311 first moves a predetermined distance ya from the original position to enter the black block 323. Meanwhile, calibration for a dark response is performed according to the standard black color. In a conventional image scanner, the calibration for a dark response is performed in a dark environment by turning off the emitting light. However, the dark response detected by the CCD of the conventional image scanner in a light-off environment is not equal to that detected in an real situation where the image pickup operation is performed in a light-on environment. Therefore, an error is existent. According to the dark response calibration of the present invention, the error can be minimized or even eliminated. Then, the CCD 311 slowly moves along the pre-determined direction in order to locate the interface between the black block 323 and the white block 322, i.e. the edge F. When the CCD 311 passes by the line F, two coordinate positions (x1,y1) and (x2,y2) are realized for the two points B and C, respectively. Afterwards, the CCD 311 further moves a predetermined distance yb to enter the white block 322. At this time, calibration for a light response is performed according to the standard white color. Then the CCD 311 keeps on moving a predetermined distance yc to a scan start S, and starts an image pickup operation. In this embodiment, the scan start S is the document line 321. Alternatively, the scan start can be different from the document line 321 as long as the scan start is in front of, rather than behind, the document line 321. In other words, the image pickup operation should start when or before the CCD 311 passes by any portion of the document 33 so as not to lose any image data.

On the other hand, the two coordinate positions (x1,y1) and (x2,y2) of the two points B and C, respectively, can be used to calculate a deflection rate and an amplification error of the scanned image relative to the linear CCD 311. The deflection rate m is calculated by an equation of:

$$m=(y2-y1)/(x2-x1),$$

and the amplification error ρ is calculated by an equation of:

$$\rho=1-[(x2-x1)^2+(y2-y1)^2]^{1/2}/L,$$

in which (x1,y1) and (x2,y2) are the detected coordinate positions of the points B and C, respectively, so that $[(x2-x1)^2+(y2-y1)^2]^{1/2}$ is the detected length between the points B and C, and L indicates a predetermined distance between the points B and C. For example, for a CCD having a resolution of 600 DPI (dot per inch), the predetermined distance, i.e. the total pixel number between the two points B and C, should be L=10*600=6000 if the length between the two points is assumed to be 10 inches. In case that the detected pixel number between the two points, i.e. $[(x2-x1)^2+(y2-y1)^2]1/2$, is 5700, the amplification error ρ will be 1−5700/6000=0.05. Once the deflection rate and the amplification error of the CCD is realized, the image data obtained by the CCD can be accordingly corrected.

In an alternative embodiment, it is the white block enclosed within the black block so that the CCD passes by the upper portion of the black block, the white block 323, the lower portion of the black block, and the document 33 sequentially when the CCD moves along the direction of the arrow A. In this case, a similar operation will be performed except that calibration for a light response is performed prior to the calibration for a dark response.

Owing to the provision of the two color blocks according to the present invention, the overall scanning speed can be improved because the CCD can directly move the distances ya, yb and yc quickly without improperly starting the image pickup operation. In addition, the accurate color calibrations can be achieved according to the two color blocks during the CCD locates the scan start. Furthermore, the deflection rate and the amplification error of the CCD can also be realized by using the interface between the two color blocks during the CCD locates the scan start. As known to those skilled in the art, the accurate color calibrations and the scan track correction contributes greatly to the enhancement of the scanned image quality.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image scanner, comprising:

a scanning platform for placing thereon an object to be scanned, marked thereon:

a document line for positioning a front edge of said object;

a first elongated color block located in front of said document line along a specific direction; and a second elongated color block located in front of said document line along said specific direction and having an interface with said first color block;

and an image pickup device passing by said scanning platform from a home position along said specific direction, performing color calibrations of a first and a second colors while passing by said first and said second color blocks, respectively, and performing a scanning operation from a scan start point behind said first and said second color blocks to read image data of said object, and converting said image data of said object into digital data for further processing;

wherein each of said first and said second elongated color blocks has a length greater than a length of said image pickup device so that said image pickup device detects colors of said first and said second elongated color blocks as standard colors for color calibrations when said image pickup device passes by said first and said second elongated color blocks.

2. The image scanner according to claim 1 wherein said first and said second color blocks are rectangular regions of standard white and standard black for performing said color calibrations so as to obtain a light and a dark responses, respectively, and said first color block is enclosed within said second color block so that said image pickup device sequentially passes by said standard black region, said standard white region and said standard black region.

3. The image scanner according to claim 1 wherein said first and said second color blocks are rectangular regions of standard black and standard white for performing said color calibrations so as to obtain a dark and a light responses, respectively, and said first color block is enclosed within said second color block so that said image pickup device sequentially passes by said standard white region, said standard black region and said standard white region.

4. The image scanner according to claim 1 wherein said interface of said first and said second color blocks includes a first reference point and a second reference point whose coordinates are detected according to color changes therearound, a shift from said first reference point to said scan start point is of a predetermined vector which can be used together with said coordinate of said first reference point for determining a position of said scan start point, and a distance between said first and said second reference points is of a constant value which can be used together with said coordinates of said first and said second reference points for determining a deflection rate of a scan track and an amplification error of a scan result.

5. The image scanner according to claim 4 wherein said scan start point is located in said document line.

6. The image scanner according to claim 4 wherein said scan start point is in front of said document line along said specific direction.

7. The image scanner according to claim 4 wherein said deflection rate m is calculated by an equation $m=(y2-y1)/(x2-x1)$, in which $(x1, y1)$ and $(x2, y2)$ are said coordinates of said first and said second reference points, respectively.

8. The image scanner according to claim 4 wherein said amplification error $\rho$ is calculated by an equation $\rho=1-[(x2-x1)2+(y2-y1)2]1/2/L$, in which $(x1,y1)$ and $(x2,y2)$ are said coordinates of said first and said second reference points, respectively, $[(x2-x1)2+(y2-y1)2]1/2$ indicates a calculated length between said two reference points, and L indicates said distance of said constant value.

9. The image scanner according to claim 4 further comprising a driving device for moving said image pickup device from said home position along said specific direction.

* * * * *